Figure 1:
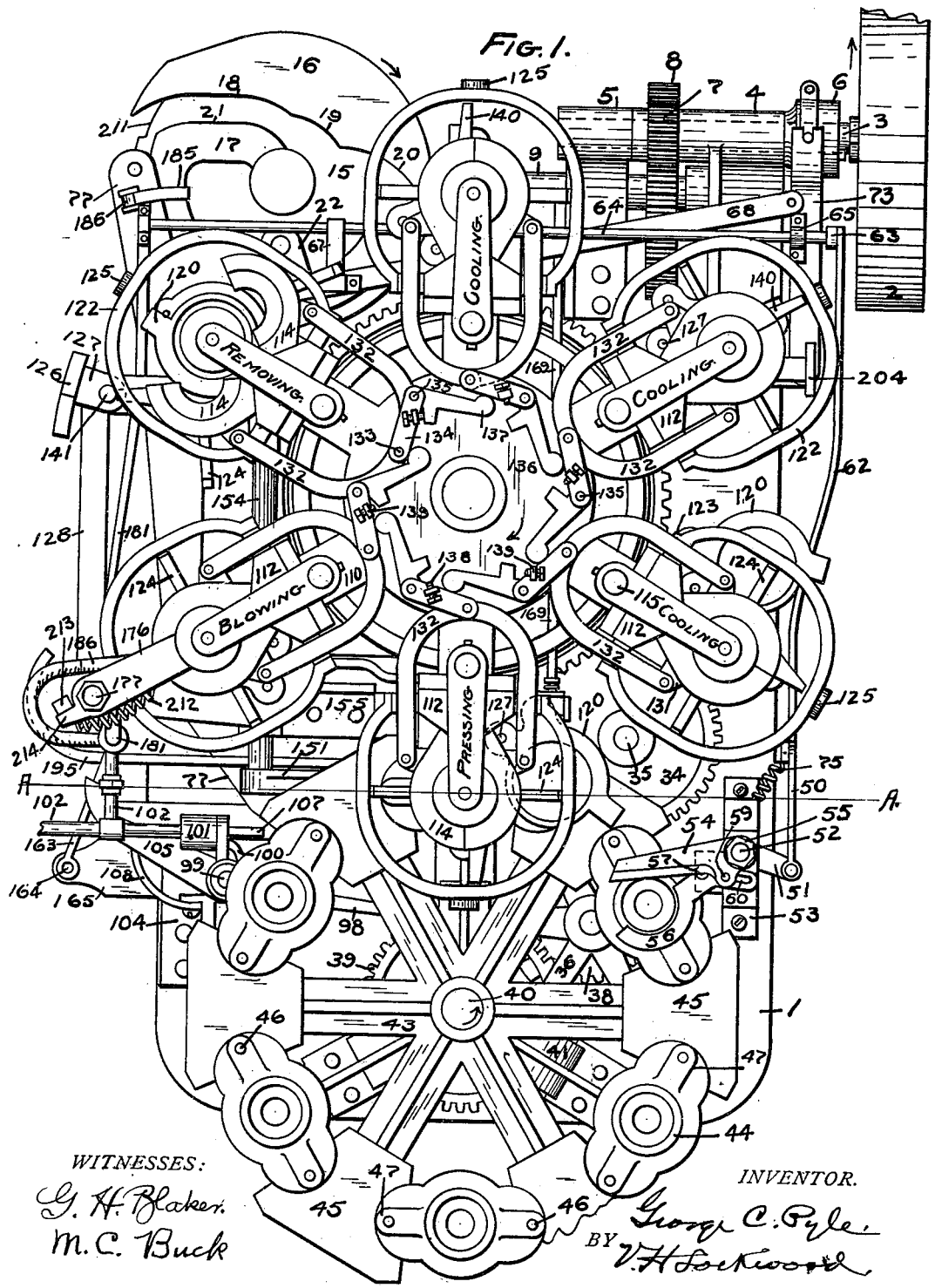

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 1.

WITNESSES:
G. H. Blaker.
M. C. Buck

INVENTOR.
George C. Pyle,
BY V. H. Lockwood
His ATTORNEY.

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 4.

WITNESSES:
G. A. Blaker.
M. C. Buck.

INVENTOR.
George C. Pyle
BY V. H. Lockwood
His ATTORNEY.

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 5.

WITNESSES:
G. H. Blaker.
M. C. Buck.

INVENTOR.
George C. Pyle
BY V. H. Lockwood
His ATTORNEY.

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 6.

WITNESSES:
G. H. Blaker.
M. C. Buck

INVENTOR.
George C. Pyle
BY V. H. Lockwood
His ATTORNEY.

THE NORRIS PETERS CO., PHOTO-LITHO., WASHINGTON, D. C.

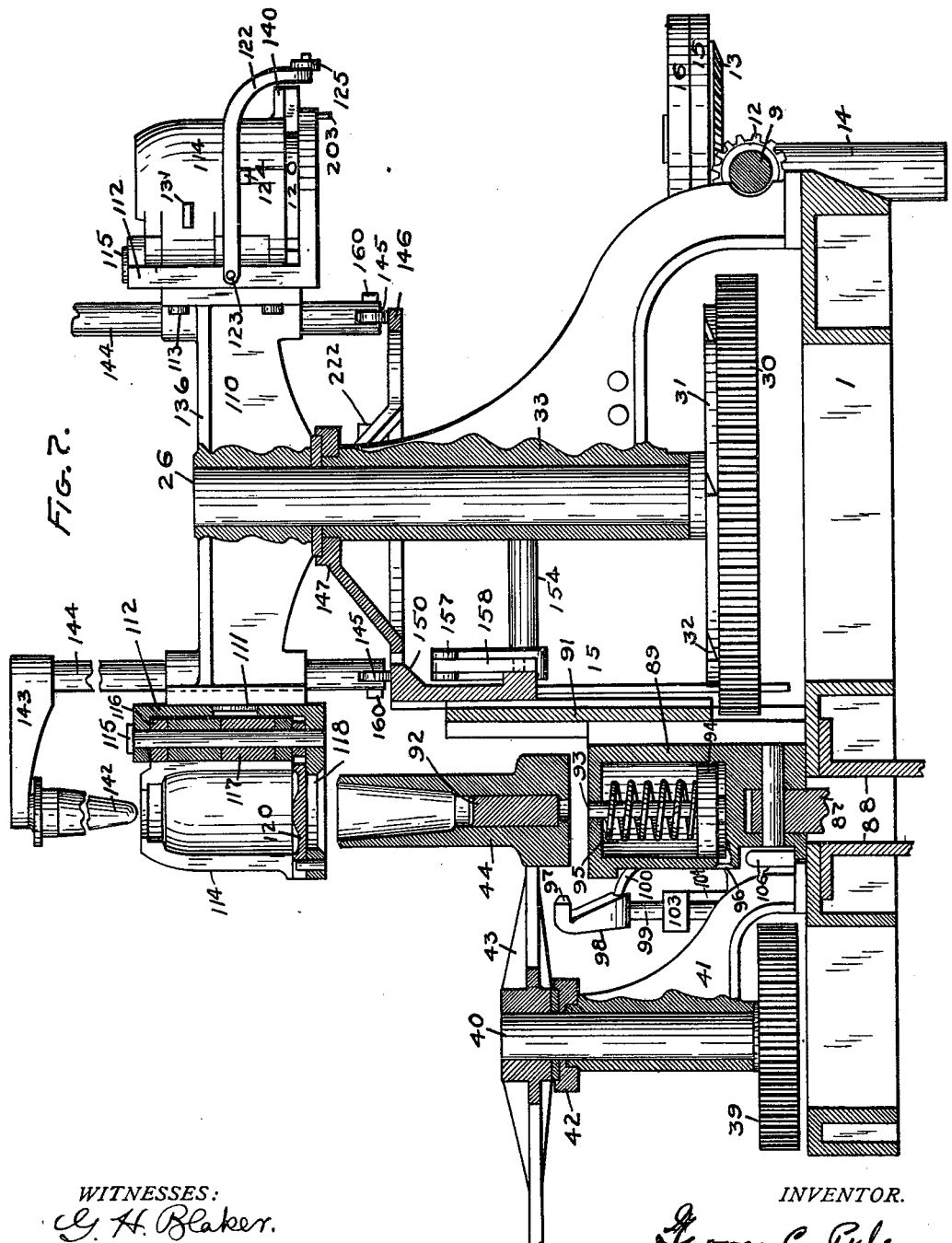

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 8.
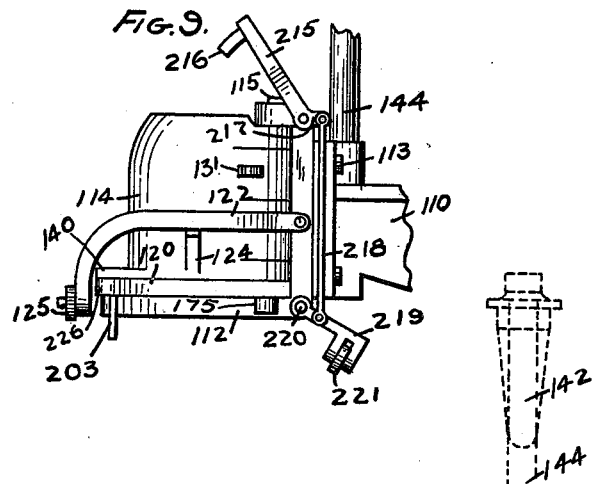
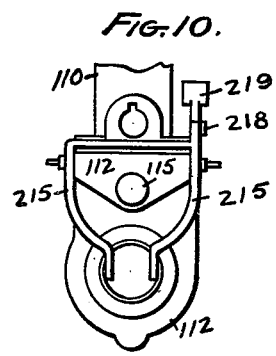
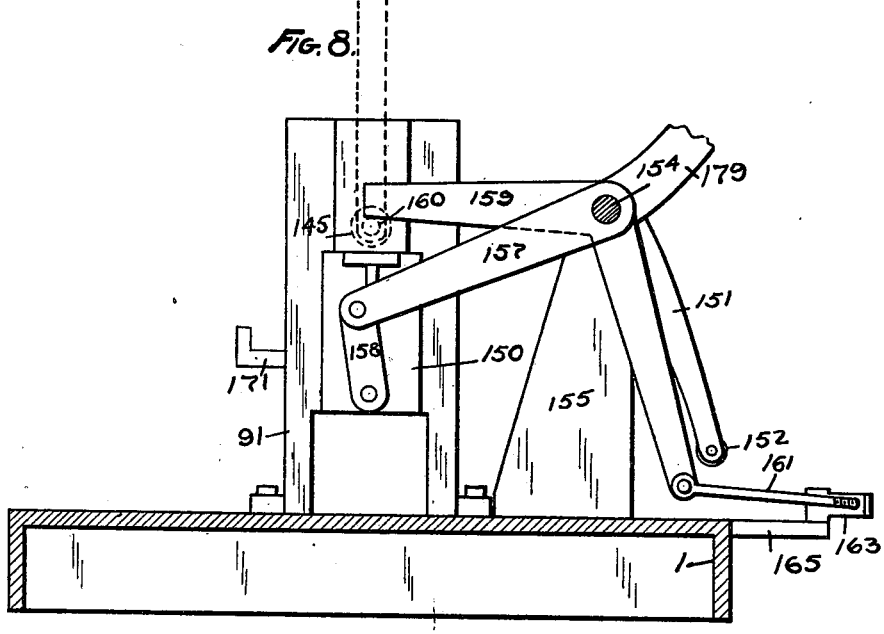
WITNESSES:
G. H. Blaker
M. C. Buck
INVENTOR.
George C. Pyle
BY V. H. Lockwood
His ATTORNEY.

No. 675,166. Patented May 28, 1901.
G. C. PYLE.
MACHINE FOR MAKING HOLLOW GLASSWARE.
(Application filed June 4, 1900.)
(No Model.) 9 Sheets—Sheet 9.
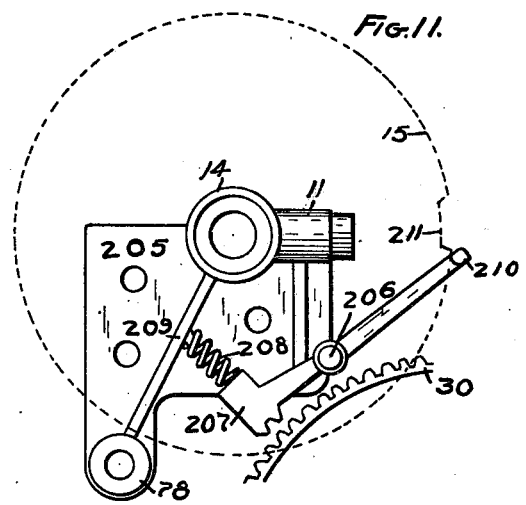
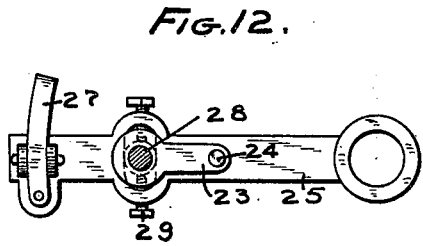
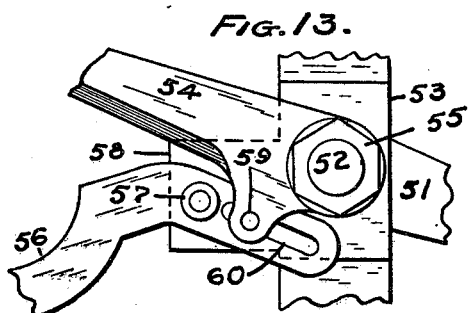
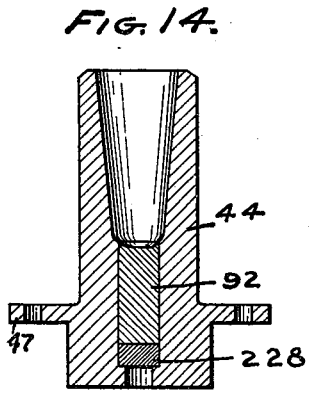
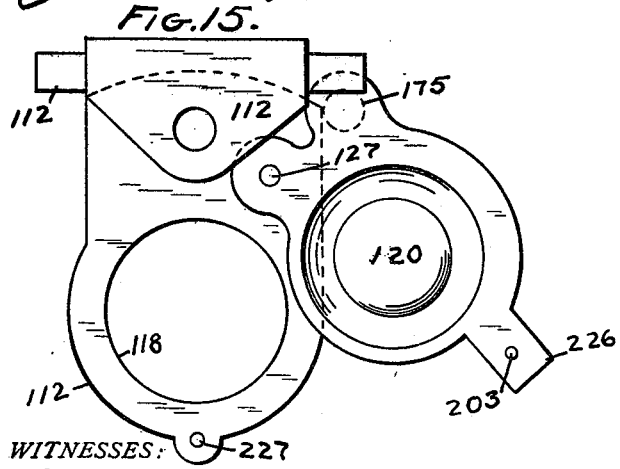
WITNESSES:
C. H. Blaker
M. C. Buck
INVENTOR.
George C. Pyle,
BY V. H. Lockwood
His ATTORNEY.
THE NORRIS PETERS CO., PHOTO-LITHO., WASHINGTON, D. C.

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 675,166, dated May 28, 1901.

Application filed June 4, 1900. Serial No. 19,059. (No model.)

*To all whom it may concern:*

Be it known that I, GEORGE C. PYLE, of Indianapolis, county of Marion, and State of Indiana, have invented a certain new and useful Machine for Making Hollow Glassware; and I do hereby declare that the following is a full, clear, and exact description thereof, reference being had to the accompanying drawings, in which like figures refer to like parts.

The object of the invention is to provide a machine for the more rapid and economical manufacture of hollow glassware, such as fruit-jars and the like. To that end the invention is such that the machine is wholly operated by one person—the gatherer. After he charges the receiving-mold with molten glass and starts the machine in operation it proceeds to make the finished article without the further assistance of any person. In discharging the article this machine lifts it when finished out of the mold, whereby the article is safe from the injury it would receive if discharged by dropping it down out of the mold or in any other manner.

In the course of manufacture the machine is so constructed that compressed air can be used to form the neck and the thread of the article by forcing the glass up about the internal former, or the former can be pressed down into the molten glass, thus forming the neck and the thread, or both can be used at the same time, as the character of the material or article may demand.

The full nature of this invention will be understood from the accompanying drawings and the description following of one form of device embodying said invention, and the scope of said invention will be understood from the claims following said description.

Figure 2:
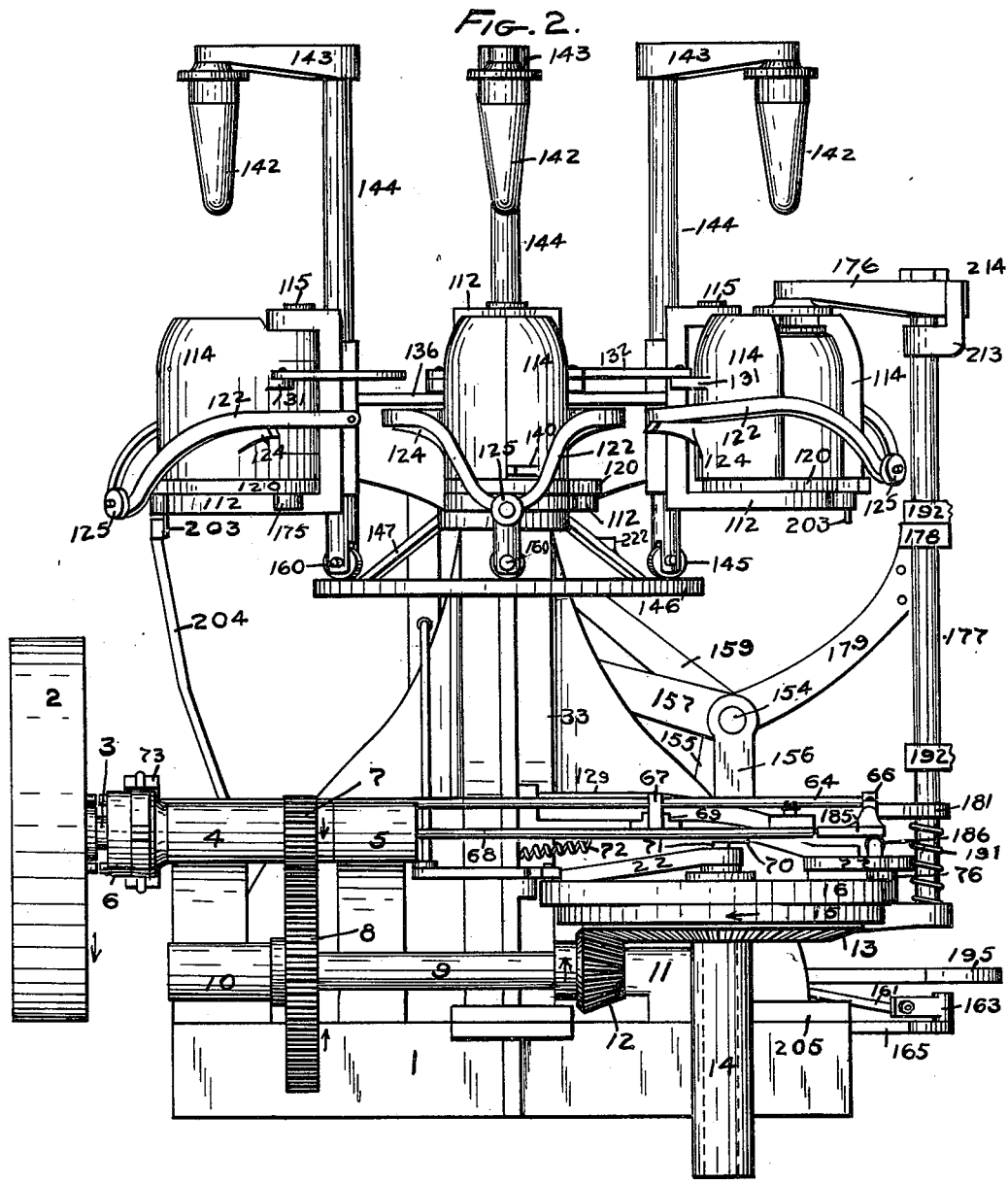
Figure 3:
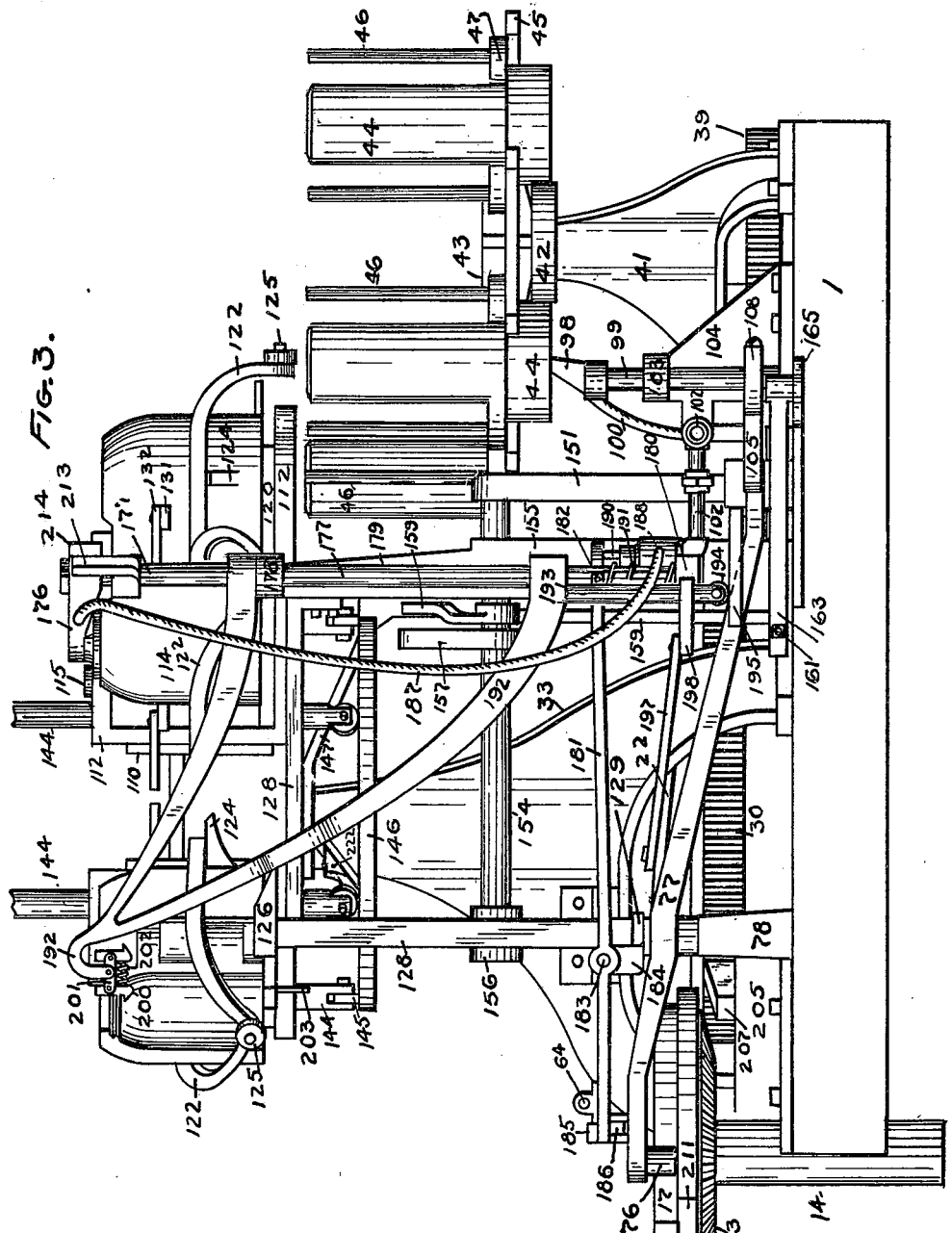
Figure 4:
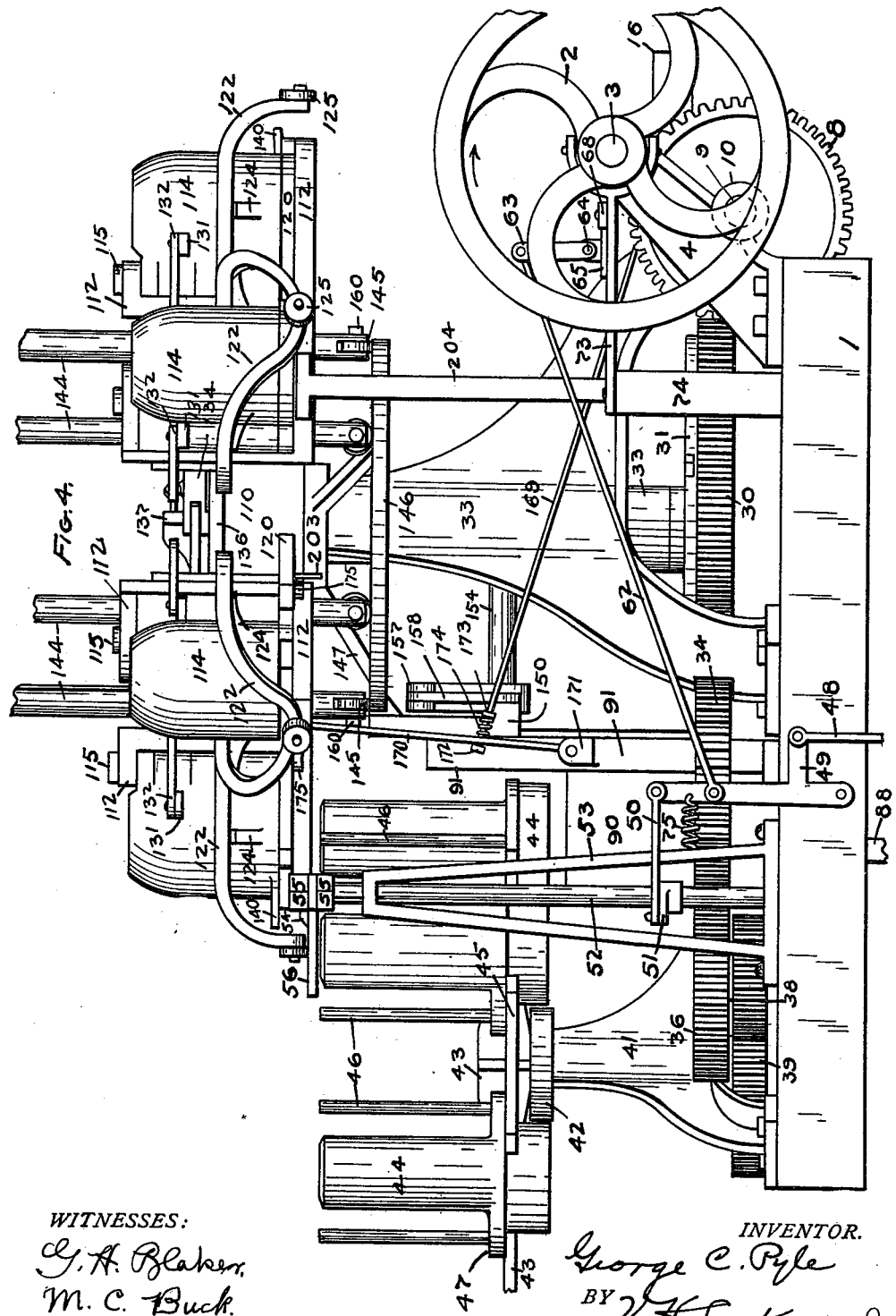
Figure 5:
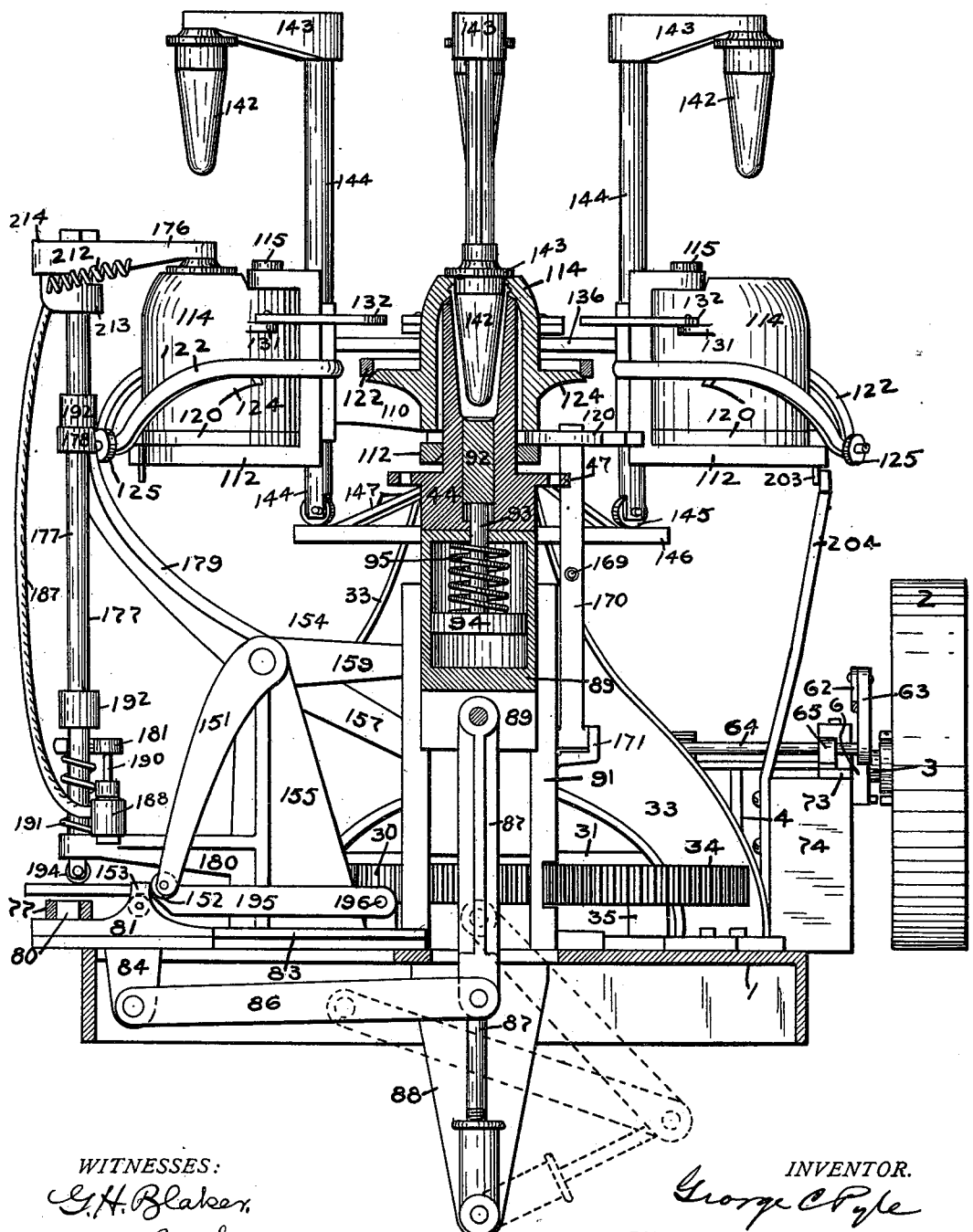
Figure 6:
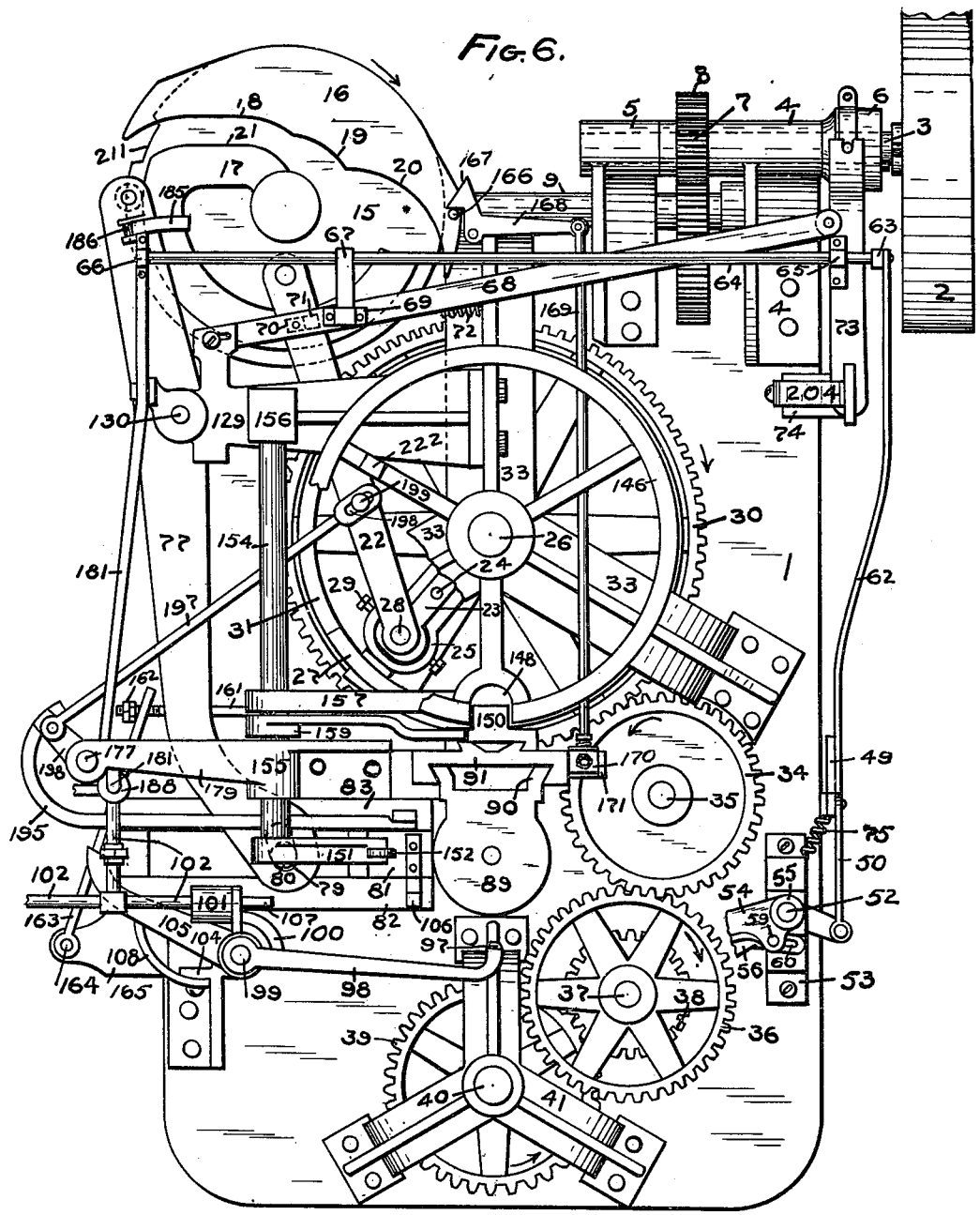

In the drawings, Figure 1 is a plan of the machine. Fig. 2 is a rear elevation of the machine. Fig. 3 is an elevation of the left-hand side as shown in Fig. 1, or the right-hand side as shown in Fig. 2. Fig. 4 is an elevation of the right-hand side as shown in Fig. 1, or the left-hand side as shown in Fig. 2, with parts broken away. Fig. 5 is a vertical section across the machine along a line running through the receiving-mold and outer mold when they are in conjunction, substantially on the line A A of Fig. 1. Fig. 6 is a plan of the machine with all the molds removed. Fig. 7 is a longitudinal vertical section of certain portions of the machine on a line running through the means for carrying both series of molds and an outer and an inner mold. Fig. 8 is a detail of the means for depressing the plunger. Figs. 9 and 10 are details of the device for holding the article centrally and stationary while the mold is being opened. Fig. 11 is a plan of the means to lock the molds in vertical alinement. Fig. 12 is a detail of the pawl mechanism that rotates the molds. Fig. 13 is a plan of a part of the knives that cut off the proper amount of glass. Fig. 14 is a vertical section of the receiving-mold as arranged when compressed air is not used. Fig. 15 is a detail of the bracket and bottom of the outer mold.

Referring to the details of construction of the machine herein shown for the purpose of illustrating the general nature of the invention, 1 is a base or suitable frame upon which the mechanism is constructed. This base or frame may be mounted on wheels for convenience, if desired.

2 is a driving-wheel actuated by a bolt or other means from some suitable source of power whereby the machine is actuated. It is mounted loosely on the shaft 3, which is mounted in the bearings 4 and 5, secured to the base or frame. Said wheel 2 is actuatingly connected with the shaft 3 for driving it by means of a clutch mechanism 6. Said shaft carries a pinion 7, that meshes with the gear 8, mounted on the shaft 9, that is carried in the bearings 10 and 11. Said shaft 9 has secured on it the bevel-pinion 12, that meshes with the bevel-gear 13, that is horizontally mounted on a vertical shaft mounted in the box 14, the shaft being shown in dotted lines in Fig. 2. On the upper side of the bevel-gear 13 there is a cam-wheel 15, having on it the cam-blocks 16 and 17, with the cam-faces 18, 19, 20, and 21. A bar 22 is pivoted at one end to the cam-wheel 15 and at the other end to the bar 23, that is pivoted at 24 to the arm 25, which is loosely mounted on the shaft 26 and at its outer end carries the pawl 27. The arm 25 is transversely slotted, as shown in Fig. 12, and the boss or pin 28 on the end of the bar 22 passes through the end of the bar 23 and enters the slot in the arm 25. The connection between the bar 22 and arm 25 is rendered adjustable by means of the set-screws 29. The object of this adjustment is to bring the receiving-mold and the blow-mold, which are mounted upon separate shafts, into vertical alinement.

Through the means just described the gear-wheel 30 is actuated. That wheel is secured on the shaft 26 and has secured to it the ring 31, provided with a series of notches 32, as appears in Fig. 7. The pawl 27 rides on this ring and engages said notches. By reason of this construction it is apparent that the actuation of the wheel 30 is intermittent. The shaft 26 is mounted in the vertical tripod-frame 33, whose legs are secured to the frame of the machine.

The gear 30 is actuated in the direction indicated by the arrow and transmits power through the intermediate gear 34, that is mounted on the spindle 35 in the framework, and the gear 36, secured to the shaft 37, and the pinion 38, secured to the same shaft, to the spur-gear 39, secured to the shaft 40, that is mounted and operates in the tripod-frame 41, that is secured to the framework. The frame 41 has a bearing 42. Secured to the upper end of the shaft 40 there is a spider 43, having six arms, which carry six receiving-molds 44. These molds are carried in the manner shown in Figs. 1 and 3. The widened ends 45 of the arms 43 are provided with a pair of vertical rods 46, that extend through holes in the ears 47 in the base of the receiving-molds 44. In other words, the molds 44, as shown in Fig. 3, are readily moved vertically by being merely elevated on the pins 46. Therefore the inner molds are mounted midway between the arms of the spider 43.

Each revolution of the cam-wheel 15 causes a one-sixth revolution of the wheel 30 and likewise a one-sixth revolution of the spider 43, that carries the inner molds.

When an inner mold 44 is in the position of the upper right-hand mold, (shown in Fig. 1,) the gatherer deposits in it a charge of molten glass. Then he depresses the rod 48 by means of a pedal or the like, which at its upper end is pivoted to the bell-crank 49. The bell-crank is pivoted to the side of the frame of the machine and at its upper end is connected by a link 50 with a crank 51 on the vertical shaft 52, that is mounted on an A-shaped frame 53, whose lower end is secured to the base-frame. On the upper end of said shaft 52 a knife-blade 54 is secured between the two nuts 55. Immediately below this is a second knife-blade 56, pivoted by the pin 57 to the plate 58, which is connected with the upper end of the stand 53. On the knife 54 there is a downwardly-extending pin 59, that operates in the slot 60 in the shank of the blade 56. The actuation of the shank 52 by the means above described will cause the two blades 54 and 56 to move toward each other like shears over the mouth of the receiving-mold until the knife 56 reaches the middle of the mold, and then it ceases to move; but the knife 54 continues to move until the glass is wholly cut off. This cessation of the movement of the knife 56 after it has reached the limit specified results from the radial movement of the pin 59 about the axis of the shaft 52 in the slot 60. In the latter part of the movement of the pin 59 it moves lengthwise of the slot 60, and therefore does not actuate the knife 56. The knife construction appears in Figs. 1 and 13. The advantage of this arrangement of knives is that when the glass is severed by the upper knife by shearing over the lower knife, which has become stationary, the glass drops vertically and centrally into the receiving-mold. If the lower knife were moving at the time that the glass was severed, actual practice shows that the glass would be thrown violently to the opposite side of the receiving-mold instead of being deposited centrally, and when that takes place it is a hard matter to produce a perfect neck. At the same time the glass is being severed or cut off the action of the bell-crank 49 pushes the rod 62 and the crank 63, that is secured at its lower end to the shaft 64, which is mounted in the two bearings 65 and 66. Such partial rotation of the shaft 64 elevates the outer end of the arm 67, that is secured to said shaft, and said arm lifts the trip-rod 68. The arm 67 operates in a saddle 69 on the trip-rod 68. The trip-rod 68 has a lug 70 on its under side, which engages the lug 71 on the upper side of the bar 22. Therefore when the trip-rod 68 is elevated by the arm 67 the lugs 70 and 71 disengage each other. Then the spring 72 draws the trip-rod 68 to the right, as shown in Fig. 6, or to the left, as shown in Fig. 2. The spring 72 is fastened at one end to said trip-rod and at the other end to one leg of the tripod 33. The trip-rod 68 is pivoted to the bar 73, which at one end is pivoted to the upper end of the post 74, that is mounted on the frame 1, as shown in Fig. 6, and at the other end is bifurcated or formed into a yoke that partially surrounds the clutch 6 for operating said clutch and throwing the machine into gear with the driving-wheel 2.

The foregoing trip mechanism is set in operation by the gatherer. Immediately after he has filled the receiving-mold with glass he throws the machine into gear and it begins operation, and when he ceases to depress the rod 48, as shown in Fig. 3, the spring 75, therein shown, returns the knives to the unoperated position and also withdraws the rod 62. The spring 75 is secured at one end to the bell-crank 49 and at the other end to the frame 53. The further operation of the machine rotates the receiving-mold one-sixth of a revolution, as has been heretofore explained, and moves it from the upper right-hand position in Fig. 1 to the upper central position therein shown—that is, into the position shown in Figs. 5 and 7. While this one-sixth revolution of the mold is taking place the cam-disk makes a half-revolution from the position shown in Figs. 1 and 6, and the point of the cam-block 16 engages the roller 76, (to be seen in Fig. 3 and shown in dotted lines in Fig. 6,) that is on the under side of the lever 77 and gradually draws the rear end of said lever 77 inward or to the right, as shown in Fig. 6. The lever 77 is pivoted on the post 78, mounted on the framework, as shown in Fig. 3, and its forward end is provided with a slot 79, that receives the pin 80, extending upward from the block 81, as appears best in Fig. 5. The block 81 slides in the guides 82 and 83 and has a downwardly-extending ear 84, as seen in Fig. 5, to which there is pivoted a pair of bars 86, which in turn are pivoted to the center of a toggle-joint 87, whose lower end is pivotally mounted on the bracket 88, depending from the framework of the machine, and whose upper end is pivoted to the bottom of the air-cylinder 89, that has on one side, as appears in Fig. 6, a pair of extensions 90, which operate in the vertical guide 91.

From the description of the mechanism just given it is apparent that the further movement of the cam-disk 15 will, through the action of the lever 77, elevate the air-cylinder 89, and the toggle-joint will be changed from the position shown in dotted lines in Fig. 6 to the position shown in straight lines in the same figure.

The receiving-mold, as shown in Fig. 7, has a cavity of three dimensions. The upper portion, wherein the molten glass is originally received, is contracted downward to a point about midway of the mold. From that point almost to the lower end of the mold the opening is of uniform diameter. In this portion of the mold the false bottom 92 is located. The lower end of the opening in the mold is contracted, so that the false bottom cannot escape downward, but is large enough to permit the upward movement of the piston-rod 93 in the air-cylinder 89. The piston-rod 93 works through an opening centrally located in the air-cylinder and is secured to the piston 94 in said cylinder. Said piston is depressed downward by the spiral spring 95. Air is admitted into said cylinder through the opening 96 under said piston 94. From this description it will appear that when air is introduced into said cylinder it will force the piston 94 upward against the action of the spring 95 and through the piston-rod 93 will elevate the false bottom 92 in the receiving-mold 44.

Air is introduced into the cylinder through the nipple 97, that enters the hole 96 when the air-cylinder is elevated. Said nipple appears in Fig. 7 mounted on the end of the hollow arm 98, as appears best in Fig. 6, where it is shown pivotally mounted on the shaft 99. (Shown best in Fig. 7.) Air is introduced into said hollow arm through the tube 100, that leads from the air-valve 101, which is supplied with air through the pipe 102, that leads from suitable source of supply. The shaft 99 is mounted in the bearing 103, supported by the bracket 104, which is secured to the frame, as appears in Figs. 6 and 7. When the forward end of the lever 77, as appears in Fig. 6, moves to the left, and thus elevates the air-cylinder 44, as has been heretofore described, said lever 77 near its limit of movement engages the arm 105, that is secured to the shaft 99, and throws said arm back, thereby moving the hollow arm 98 and the nipple 97 toward the air-cylinder, whereby the nipple enters the opening 96. At the same time the lug 106 on the sliding block 81 engages the valve-stem 107, that operates the air-valve, so that air is introduced through the means heretofore described into the air-cylinder. After the forward end of the lever 77 has reached its limit of movement and has started upon its return movement, thus releasing the arm 105, the spring 108 throws said arm 105 back into the position shown in Fig. 6, and thereby removes the nipple 97 from engagement with the opening in the air-cylinder. This spring is secured by a screw to the bracket 104 and its free end bears against the arm 105.

Referring now to Fig. 7, a horizontally-rotating spider 110 is secured to the upper end of the shaft 26, resting upon the tripod-frame 33 and supporting said shaft therein. Said spider has six equidistant radial arms. The vertical faces on the outer ends of said arms have each a central boss 111, about which there is placed, against said outer face, a bracket 112, that is secured by the bolts 113. The upper and lower ends of said brackets are turned at a right angle, so as to be horizontal to the body of the bracket and parallel with each other, the lower end, however, being extended much farther than the upper end, as shown in Fig. 7. To this bracket there are pivoted two halves of the outer mold 114 by a pin 115, that extends through the top and bottom flanges 112 and the hinges 116 and 117 of each mold. In other words, each mold has two hinges 116 and 117 and the hinges of the two halves alternate. The lower part of the bracket 112 is provided with the opening 118, through which the receiving-mold 44 may be inserted. The bottom 120 of said outer mold is pivoted to the pin 127, so as to be laterally removable, as appears in Fig. 15.

Referring to Figs. 1 and 7, there will be observed a yoke 122, that surrounds the outer mold and is pivoted on each side of the bracket 112 at 123. This yoke is large enough to permit the two parts of the mold to be swung open, as shown in the upper left-hand corner of Fig. 1. The two halves of said mold have horizontally-extending lugs 124 immediately under the yoke 122, and when the mold is closed the yoke is depressed partially about the inclined ends of said lugs in order to hold the parts of the mold tightly closed. The yoke releases said molds by its outer end being elevated somewhat. This is done by the roller 125 running up on the inclined block 126, (shown in the upper left-hand corner of Fig. 1,) mounted on the bracket 127, that is secured on the upper end of the casting 128, which rests on the plate 129, that is secured to the tripod 33 and the pivot 130 of the lever 77, as shown in Fig. 6.

On the sides of the two molds there are ears 131, to which a pair of curved bars 132 are pivoted, as appears in Fig. 1. These bars at their outer ends unite and are pivoted by the pin 133 to the link-bar 134, that at 135 is pivoted to the plate 136. The plate 136 is round and mounted on the spider 110. The mechanism just described is repeated for each mold, so that there is an annular series of link-bars 134. For each of said link-bars there is a bell-crank 137, pivoted to the pin 135 and with one arm engaging the next link-bar 134 in the series by pressing against it, as appears in Fig. 1. The other arm of the bell-crank 137 is engaged by a set-screw 138, that operates in the lug 139 on the link-bar 134.

On one half of each outer mold there is an outwardly-extending lug 140, as appears in Figs. 1 and 7. As the series of molds is revolved said lug engages the pin 141, that extends vertically from the plate 127. (Shown in the left-hand side of Fig. 1.) Such engagement causes the half of the mold to which the lug 140 is attached to be thrown open, as appears in the left-hand corner of Fig. 1. Such backward movement of that half of the mold pushes the bar 132 backward also—that is, the left-hand bar attached to the open mold in Fig. 1. As that bar is pushed backward it pushes backward the end of the link-bar 134, to which said bar 132 is pivoted, and the backward movement of said link-bar simultaneously operates the other bar 132, attached to the other half of the same mold. In this way the two halves of the mold are simultaneously separated and opened, as appears in Fig. 1. Such backward movement of the link-bar 134 likewise through the set-screw 138 actuates the bell-crank 137, which pushes forward the link-bar 134 and the bar 132 of the preceding mold, and such movement closes said bar, as appears in the upper part of Fig. 1. Said mold remains closed during the further revolution until it again arrives at the position of the open mold at the upper left-hand corner of Fig. 1.

Turning now to the plungers or internal formers 142, they are carried on the arms 143 from the rod 144, which vertically reciprocates through the arms of the spider 110, as appears in Figs. 1 and 7. At their lower ends a friction-roller 145 is mounted, and all these plunger-rods ride on a horizontal track 146, supported stationary on the upper end of the tripod-frame 33 by the bracket 147, as appears in Figs. 6 and 7. Said track 146 is circular, as appears in Fig. 6, and has a gap 148 at a point opposite the place where the receiving-molds and outer molds move into alinement with each other in the center of the machine. When the plunger-rod in its revolution reaches this gap, it moves upon the vertical slide or support 150, as appears in Fig. 7. The slide 150 operates in the guideway formed in the back of the vertical guide-bar 91, as appears in Fig. 6. Said guide is actuated by the means shown in Fig. 8. When the sliding block 81 is moved by the action of the lever 77 to the left from the position shown in Fig. 6 to the position shown in Fig. 5, such movement of said block 81 permits the lower end of the crank 151 (shown in both figures) to move to the left. A friction-wheel 152 is mounted on the lower end of said crank and engages the right side of the upwardly-extending rib 153 on the plate 81. The crank 151 is secured to the shaft 154, that is mounted in the posts 155 and 156. Nearly midway between the ends of said shaft it has secured to it a crank-arm 157, that is connected by a link 158 to the slide 150, as appears in Fig. 8. From this it is clear that when the lever 77 moves the sliding block 81 to the left in the figures referred to the weight of the plunger, arm, and rod will move it down into the position shown in Figs. 5 and 8, whereby it enters the molds, as appears in the former figures, and assists in forming the neck of the article. Said plunger is positively forced downward in the latter part of its movement by the bell-crank 159, as appears in Fig. 8, that is loosely pivoted on the shaft 154. One end of the bell-crank engages and rides upon the head of the bolt 160 at the lower end of the plunger-rod, as appears in Figs. 7 and 8. The other end of the bell-crank is withdrawn by the link 161, that is pivoted to the bell-crank, and at the other end has check-nuts 162. Against these nuts the spring 163 acts, as appears in Fig. 6. Said spring 163 is pivoted at 164 to the bracket 165, secured to the base-frame, and is engaged and actuated by the sliding block 81 near the limit of its movement to the left, as shown in Fig. 5. The plunger-rod is elevated by the reserve movement of the lever 77, forcing the sliding block 81 from the position shown in Fig. 5 to the position shown in Fig. 6, acting against the crank 151, which through the crank 157 and link 158 elevates the slide 150, that supports the plunger-rod. At the end of such movement the support 150 will be in line with the track 146, and the further rotation of the plunger will move it off the support 150 upon said track.

The parts heretofore described explain the mechanism necessary to place a receiving-mold 44 and an outer mold 114 in vertical alinement and to elevate the receiving-mold into the position shown in Fig. 5 and to depress the plunger into the position shown in said figure and also to withdraw said receiving-mold and plunger from the outer mold into the position shown in Fig. 7. As soon as they are withdrawn the pin 166 on the cam-block 16, as appears in Fig. 6, approaches and engages the inclined face 167 of the bell-crank 168, that is pivoted on one leg of the tripod 33, and actuates said bell-crank. The outer end of the bell-crank is pivoted to a connecting-rod 169, that runs to a lever 170, that is pivoted at its lower end, as appears in Fig. 4, to a bracket 171, that is secured to the side of the vertical guide-bar 91, as appears in Figs. 4 and 6. There is a yielding connection between the rod 169 and the lever 170, as appears in Fig. 4, effected by extending the rod 169 through a hole in the lever 170 and placing two nuts 172 and 173 on said lever and a spring 174, acting between the lever 170 and one of said nuts. When the lever 170 is actuated or pushed to the left, as shown in Fig. 4, it engages the friction-roller 175 on the under side of the bottom 120 of the outer mold, that is pivoted at 127, and closes said bottom by pushing it from the position shown near the middle of Fig. 1 to a closed position, as shown in Fig. 7. After the bottom of the outer mold is closed the partly-finished article is ready to be blown. When the outer mold is moved one-sixth of a revolution from the central position, (shown in Fig. 1,) the article is blown by the means best shown in Fig. 3. There is a cap 176, loosely mounted on the upper end of the rod 177, that is vertically reciprocable in the bearing 178, that forms the upper end of the curved extension 179 from the post 155. The lower end of the rod 177 is mounted in the arm 180 from the post 155, as appears in Fig. 5. Said cap 176 is depressed by the lever 181, that is pinned to the rod 177 at 182, as appears in Fig. 3. The lever 181 is fulcrumed at 183 to the bracket 184, that is turned up from the plate 129. At the other end of the lever 181 there is a horizontal arm 185, that is engaged and elevated by the roller 186, mounted on the upper side of the lever 77, as appears in Figs. 3 and 6. This roller in its movement to the right, as shown in Fig. 6, moves under the arm 185, thus elevating that end of the lever 181 and depressing the end that is pivoted to the vertical rod 177, and this closes the cap down over the mold, as shown in Fig. 3. Compressed air is introduced into the mold through the tube 187, that enters it through the cap 176 and leads from the valve 188, that is supplied through the pipe 102, as appears in Fig. 6. That valve is opened by the end of the lever 181 depressing the valve-stem 190, as appears in Fig. 3, when the rod 177 is depressed, as heretofore explained. The return movement of the lever 77 causes the roller 186 to disengage the end 185 of the lever 181, when the spring 191, coiled about the rod 177 between the arm 155 and the lever 181, elevates said rod 177 and also the cap 176 and relieves the valve-stem 190, so as to shut off the compressed air through the tube 187. The blowing just described finishes the article, and it is discharged after another one-sixth revolution of the mold to the position shown at the upper left-hand corner of Fig. 1. Then the roller 125 on the yoke 122, as appears in Fig. 1, rides upon the incline 126, thus elevating said yoke and disengaging it from the arms 124, which unlocks the mold. Then the lug 140 on one section of the mold engages the pin 141 on the plate 127 and by the means heretofore explained opens the mold.

The finished article is removed from the mold by being elevated by the crane 192. It has two arms. The upper one is loosely pivoted on the rod 177 immediately above the bearing 178, so that said bearing holds the crane in its normal position. The lower arm has an extension 193, carrying at its extreme bottom a friction-roller 194, which rides upon the curved end of a lever 195, as appears in Fig. 6, which extends horizontally into the machine, as shown in Figs. 5 and 6, and is pivoted at 196 to the guide-frame 83. Said lever is widened at its inner end, as appears in Fig. 5, and it rides on a roller mounted on one side of the sliding block 81 and appearing in dotted lines in Fig. 5. When said sliding block is in its inward position, the outer end of the lever 195 is elevated, and when said block is in its outer position, as appears in Fig. 5, the outer end of said lever is depressed. The crane is swung into a position where its engaging end is over the mold by the connecting-rod 197, (shown in Fig. 6,) that is pivoted at its outer end to the crank 198, secured to the extension 193 from the crane. The inner end of the rod 197 is provided with a slot 198, through which the pin 199 in the lever 22 extends. Assuming said lever 22 to be in the position substantially opposite to what it is in said Fig. 6 and its pivoted end is being elevated to the right, it will be obvious that the crank 198 will be moved likewise to the right, which will swing the crane inward toward the machine and to a point immediately above the mold. On the end of the crane there is a catch formed of two vertical hook-bars 200, pivoted to the cross-bar 201, that is centrally mounted in the gooseneck end of the crane, as shown in Fig. 3. The lower ends of the hook-bars have inclined outer faces, so that they will move toward each other or collapse somewhat in entering the mouth of the jar or mold, and they are spread apart by the spring 202, that is mounted between them. After the engaging end of the crane has been moved into a position over the mold the outward movement of the sliding block 81 to the position shown in Fig. 5 permits the outer end of the lever 195 to drop down, thus depressing the catch on the end of the crane into the mold or glass article. The hooks spread after passing the neck of the article, and the reverse movement of the sliding block 81 (shown in Fig. 5) elevates the outer end of the lever 195, thus elevating the end of the crane that carries the glass article. The further movement of the cam-disk 15, acting on the bar 22, (shown in Fig. 6,) pushes the rod 197 outward, and likewise the crank 198, and thus swings the crane away from the machine with the jar suspended therefrom. I do not wish to be confined to the particular catch shown on the crane, as it will have to be modified to suit the kind of article being made.

The means for throwing the mechanism out of gear is as follows: At the end of each revolution of the cam 15 the lug 71 on the bar 22 engages the lug 70 on the bar 68 and moves the latter to the left, as shown in Fig. 6, thus disengaging the members of the clutch 6. Therefore the cam-disk 15 makes one revolution each time the machine is operated, and that revolution causes the molds to move one-sixth of a revolution. When the machine is thus thrown out of gear, it will remain so until the gatherer again operates the bell-crank 49 (shown in Fig. 4) to throw it into gear.

The bottom of the mold is opened by the pin 203, extending downward from the bottom of the mold, engaging the arm that is secured to the bracket 74, as appears in Figs. 2, 4, and 6.

The means for carrying the molds are locked while the operation of the parts is going on and while the receiving-mold and an outer mold are in vertical alinement by the means shown in Fig. 11. There the dotted line represents the cam-disk 15 as viewed from the under side. 205 is a plate secured to the frame of the machine and carries the bearing 14 on said plate at 206. The pawl 207 is pivoted. It is provided with teeth to engage the teeth of the gear-wheel 30 and is pressed into engagement with said teeth by the spring 208, fitting between the head of the pawl and the rib 209 on the plate 205. The pawl is held out of engagement with the wheel 30 by the periphery of the disk 15 as it engages the upturned end 210 of the pawl. The pawl is let into engagement with the wheel 30 by the notch 211, that is seen also in Figs. 1 and 6. The arrangement is such that said notch will receive the end of the pawl when a receiving-mold is beneath an outer mold and retain the pawl until the operation of pressing is completed. Then the further rotation of the cam-disk 15 will remove the pawl from engagement with the wheel 30.

In case there is any projecting glass from the outer mold when it moves into position for blowing the cap 176 is permitted to swing out of the way by reason of its being pivotally mounted on the rod 177. It is withdrawn in normal position and so held by the spring 212, that is connected at one end to said cap and at the other end to the stop 213. This stop is rigidly secured to the rod 177 and extends up to engage the shank 214 of the cap.

To hold the article of glass in a mold while the mold is being opened, so that it will not be misplaced by the opening sections of the mold, I provide the means shown in Fig. 9, consisting of a pair of arms 215, with downwardly-projecting fingers 216, that rest on the top of the mouth of the article, as shown in Fig. 10, or enter the same, as may be desired. The arms 215 are pivotally mounted in the bracket 112 by means of the rod 216 and has a crank 217 rigidly secured to it, that is connected by the rod 218 with the arm 219, pivoted to the bracket 212 at 220. The arm 219 carries a roller 221, that is engaged by the projection 222 on an arm of bracket 137 of the circular track 136, as appears in Fig. 6. When this occurs and the arm 219 is elevated, the arms 215 are depressed into engagement with the article and hold it only while the mold is being opened. As soon as the molds are open, as shown in Fig. 1, the arms 215 return to their upper position, as shown in Fig. 9, out of the way of the removing-crane.

From the foregoing description the operation of the various parts of this machine will be understood without further explanation. As shown in Fig. 1, each series of molds moves in a separate circle, with the two circles of movement touching at the point where the receiving-mold and the outer mold come into vertical alinement. Each series of molds in each separate operation of the machine moves one-sixth of a revolution. Looking at the outer molds, they and the parts connected with them are cooling during one-half of the entire revolution of a single mold, and in one stage of the movement the article is being pressed in the outer mold, in another is being blown, and in another is being removed. In each one-sixth revolution the entire machine ceases operation while the gatherer is charging a receiving-mold. As soon as the glass is deposited in the receiving-mold he trips the machine in operation, and while it is operating so as to move the molds a one-sixth revolution he is gathering a new supply of glass for the next receiving-mold. The machine will automatically stop at each one-sixth revolution of the mold. He then charges another receiving-mold and again trips it, and this operation is repeated. When the receiving-mold that is supplied with glass moves under the outer mold, as shown in Fig. 7, it has reached the end of a one-sixth revolution, and the inner mold, by the means heretofore described, moves up into the outer mold into the position shown in Fig. 5, and at the same time the internal former or plunger corresponding with such mold moves down into the position shown in that figure. Then the compressed air enters the air-cylinder 89 and causes the false bottom 92 to move upward and press the glass about the internal former to form the neck and threads on the neck of the article. Then the internal former and inner mold are elevated and depressed, respectively, and the bottom 120 is moved into place under the unfinished article. A further one-sixth revolution brings it to the place for blowing and another one-sixth to the place of delivery. The operation of the means for blowing and delivery has been explained. Therefore while one article is being removed, another article being blown in the following mold, another article being pressed in the mold following the latter, and a supply of glass is being placed in a receiving-mold the other molds not in use at the time are cooling.

The mechanism which brings about the proper consecutivity of operation of the various parts has been explained.

If desired, the use of compressed air for forcing the glass up in the receiving-mold about the internal former may be dispensed with by placing a block 204 or some support under the false bottom 92, so as to form a continuous bottom in the receiving-mold and forming the neck of the article merely by the depression of the plunger, as has been heretofore explained.

Having now particularly described and ascertained the nature of my said invention and in what manner the same is to be performed, I declare that what I claim is—

1. A machine for making hollow glassware including a suitable outer mold, a receiving-mold, a plunger or internal former, and means for simultaneously moving said receiving-mold up into the outer mold and said plunger or internal former down into the molds.

2. A machine for making hollow glassware including a suitable outer mold, a receiving-mold, a movable bottom in said receiving-mold, a plunger or internal former, means for simultaneously moving said receiving-mold up into the outer mold and said plunger or internal former down into the molds, and means for elevating the movable bottom in the receiving-mold after said mold has been elevated.

3. A machine for making hollow glassware including a suitable outer mold, a receiving-mold, a movable bottom in said receiving-mold, an air-cylinder under said receiving-mold, a piston in said air-cylinder adapted to elevate the movable bottom in the receiving-mold, a plunger or internal former, means for simultaneously depressing the plunger and elevating the air-cylinder, whereby the receiving-mold will be forced up into the outer mold, and means for introducing air into said air-cylinder, after the receiving-mold is in place for elevating the movable bottom therein.

4. A machine for making hollow glassware including a suitable outer mold, a horizontally-rotatable spider, vertical guide-rods on the ends of the arms of the spider, receiving-molds mounted between the pair of guide-rods with ears through which said guide-rods extend, and means for elevating said receiving-mold in the outer mold.

5. A machine for making hollow glassware including a suitable mold, a plunger adapted to enter one end of said mold, a movable bottom in the other end of said mold, means for actuating said mold, an air-cylinder under said mold, a piston in said air-cylinder with a piston-rod extending into the mold to elevate the movable bottom toward the plunger, a spring that resists the movement of said piston, and means for introducing air into said air-cylinder.

6. A machine for making hollow glassware including a mold to receive the molten glass, a knife for cutting off the glass formed of two shear-like parts, means for moving the lower part of the knife to the center of the mold, and means for moving the upper part of the knife entirely across to completely sever the glass.

7. A machine for making hollow glassware including a mold to receive the molten glass, an oscillatory shaft mounted near said mold, a knife consisting of two shear-like blades, the upper blade of said knife being secured to said shaft, a stationary means to which said lower blade is pivoted, and a movable connection between the shanks of the two blades, whereby the movement of the upper blade will move the lower blade until it reaches the center of the mold but will not move it farther.

8. A machine for making hollow glassware including a mold to receive the molten glass, an oscillatory shaft mounted near said mold, a knife consisting of two shear-like blades the upper blade of said knife being secured to said shaft and having an ear near the point of its attachment, and the lower blade of said knife having a slotted shank, a stationary means to which said lower blade is pivoted between its slotted shank to the body thereof, and a pin from the ear of the upper blade that operates in the slot in the lower blade, the slot in said lower blade extending in such direction that said lower blade will cease to move inward after it reaches the mouth of the mold.

9. A machine for making hollow glassware including a mold formed of two vertical halves, a vertical plate to which said sections of the mold are hinged so as to swing horizontally, lugs extending from the opposite sides of the mold with vertically-inclined faces, a yoke pivoted at one end to the sides of said plate and which surrounds the mold and whose width is such that it wedges down on the inclined ends of said lugs, and means for engaging and elevating the outer end of the yoke when it is desired to unlock said molds.

10. A machine for making hollow glassware including a mold, formed of two vertical faces hinged together, a pair of bars pivoted to the two sections of said mold and extending backward, means to which the two backward ends of said bars are pivoted whereby when one bar moves backward it will force the other bar to move simultaneous and parallel therewith, a lug on one section of said mold, and means with which said lug engages in the rotation of the mold for opening said mold.

11. A machine for making hollow glassware including a plate, a series of molds around the plate, a pair of parallel bars pivoted to the sections of the molds and extending backward therefrom, a link pivoted to the plate at one end and to said pair of bars at the other end, and a bell-crank pivoted to said plate that engages the links for two molds so that the movement of one link when the mold is opened will move the link for the next mold so that it will through said parallel arms close said arms.

12. A machine for making hollow glassware including a series of molds, means for opening the mold, means for closing the mold, and a connection between the means for opening one mold and closing the next which will cause the former to actuate the latter next in the series.

13. A machine for making hollow glassware including a revolving mold, an undivided bottom for said mold pivoted so as to be horizontally removable, and means adapted to engage said bottom and move it from under the mold as the latter revolves.

14. A machine for making hollow glassware including a revolving mold, a bottom for said mold pivoted so as to be horizontally removable, a pin on said bottom, and an arm extending up from the framework of the machine in the path of the bottom of the mold and adapted to engage the pin thereon and turn the bottom on its pivot from under the mold.

15. A machine for making hollow glassware including a mold formed of two sections, a bracket to which said sections are horizontally pivoted and with its bottom extended beneath said mold with an opening into the mold, and a bottom for the mold that is pivoted to said bracket and is movable horizontally between the bottom of the bracket and the mold.

16. A machine for making hollow glassware including a mold, a bottom therefor that is horizontally movable, a lever fulcrumed at its lower end and whose upper end is adapted to engage and when moved close the bottom of the mold, and a spring-controlled rod for actuating said lever.

17. A machine for making hollow glassware including a circular track with a gap at one point, a series of plunger-rods movable on said track, and a vertically-movable support in said gap for receiving said plunger-rods one at a time and lowering the same.

18. A machine for making hollow glassware including a suitable mold, a circular track with a gap in it opposite the mold, a plunger-rod mounted vertically reciprocable over said track, a roller on the lower end of said rod that rides on the track, a vertically-movable support in the gap of the track to receive the plunger-rod and lower the same.

19. A machine for making hollow glassware including an outer mold, a receiving-mold under the outer mold, an air-cylinder under the receiving-mold with an air-port therein, a movable bottom in the receiving-mold, a piston in the air-cylinder for elevating such movable bottom, a tubular arm pivoted at one end and having a nipple at the other end to engage the air-port of the air-cylinder when elevated, a connection between said tubular arm and a source of compressed air, a valve in such connection for admitting air therethrough, and a common means for simultaneously elevating the air-cylinder, actuating said valve, and moving said tubular arm into engagement with the air-cylinder.

20. A machine for making hollow glassware including an outer mold, a receiving-mold under the outer mold, an air-cylinder under the receiving-mold with an air-port therein, a movable bottom in the receiving-mold, a piston in the air-cylinder for elevating said movable bottom, the tubular arm 98 with a nipple at one end to engage the port of the air-cylinder when elevated, a vertical shaft 99 to which said tubular arm 98 is pivoted, the arm 105 secured to said shaft 99, the compressed-air-supply tube 102, the valve 101, the connection 100 between said valve and the tubular arm 98, the slide 81 for engaging the arm 105, the lug 106 on the plate 81 for opening the valve 101, and the toggle 87 that is actuated by the sliding plate 81 for elevating the air-cylinder and receiving-mold.

21. A machine for making hollow glassware including a series of rotating molds, a vertically-movable rod, a cap-arm pivoted to said rod and extending with the cap end thereof in line over the series of molds, a stop to limit the movement of said cap-arm in the direction opposite to movement of the molds, and a spring that tends to hold said cap-arm against said stop.

22. A machine for making hollow glassware including suitable molds, a crane provided with an upper and lower arm substantially as shown pivoted to be vertically movable, a lever provided with a curved end, means, driven by the machine for operating said lever, a rod extending down from the crane and riding on the curved end of said lever, a crank secured on said rod, a means driven by the machine for actuating said crank and thereby swinging the crane, and means for operating the lever and the crank being arranged to act alternately, and means on the end of the crane for engaging the article when completed.

23. A machine for making hollow glassware including suitable molds, a crane consisting of two arms as shown, the rod 177, on which said crane is pivoted, the lever 195 fulcrumed between its ends and with its outer end curved, means for depressing the inner ends of said lever, the rod 193 for supporting the crane on the curved end of said lever 195, a roller on the lower end of the rod 193, the crank 198 secured to said rod 193, the connecting-bar 197 pivoted to the crank 198, means for actuating said connecting-rod, and means on the end of the crane for grasping the finished article.

In witness whereof I have hereunto affixed my signature in the presence of the witnesses herein named.

GEORGE C. PYLE.

Witnesses:
  G. H. BLAKER,
  M. C. BUCK.